(12) United States Patent
Soleno

(10) Patent No.: US 11,594,969 B2
(45) Date of Patent: Feb. 28, 2023

(54) NON-INVERTING BUCK-BOOST CONVERTER

(71) Applicant: Astec International Limited, Kowloon (HK)

(72) Inventor: Antonio Remetio Soleno, Mandaluyong (PH)

(73) Assignee: Astec International Limited, Kowloon (HK)

( * ) Notice: Subject to any disclaimer, the term of this patent is extended or adjusted under 35 U.S.C. 154(b) by 129 days.

(21) Appl. No.: 17/138,050

(22) Filed: Dec. 30, 2020

(65) Prior Publication Data
US 2022/0209670 A1    Jun. 30, 2022

(51) Int. Cl.
*H02M 3/158* (2006.01)
*H02M 1/00* (2006.01)

(52) U.S. Cl.
CPC ........ *H02M 3/1582* (2013.01); *H02M 1/0025* (2021.05)

(58) Field of Classification Search
CPC . H02M 1/0009; H02M 1/0025; H02M 3/1582
See application file for complete search history.

(56) References Cited

U.S. PATENT DOCUMENTS

| | | | | |
|---|---|---|---|---|
| 5,402,060 A * | 3/1995 | Erisman | ............ | H02M 3/1582 323/344 |
| 7,221,107 B2 * | 5/2007 | Melis | ................ | H05B 41/3928 315/246 |
| 7,336,056 B1 | 2/2008 | Dening | | |
| 8,305,055 B2 | 11/2012 | Wu et al. | | |
| 8,912,779 B2 | 12/2014 | Ren et al. | | |
| 9,035,640 B2 | 5/2015 | Deng | | |
| 9,837,901 B1 * | 12/2017 | Volk | ...................... | H02M 3/158 |
| 9,966,851 B2 | 5/2018 | Ouyang | | |
| 10,014,777 B1 | 7/2018 | Shumkov et al. | | |
| 10,014,778 B1 * | 7/2018 | Wei | ..................... | H02M 3/1582 |
| 10,355,596 B2 | 7/2019 | Choquet | | |
| 2005/0007089 A1 * | 1/2005 | Niiyama | ............. | H02M 3/1582 323/284 |

(Continued)

FOREIGN PATENT DOCUMENTS

CN    102742135 A    10/2012
CN    106992679 A    7/2017

(Continued)

OTHER PUBLICATIONS

David C. Jones, et al., Buck-Boost Converter Efficiency Maximization via a Nonlinear Digital Control Mapping for Adaptive Effective Switching Frequency; IEEE, 13 pages.

(Continued)

*Primary Examiner* — Gustavo A Rosario-Benitez

(57) ABSTRACT

A buck-boost converter circuit, such as a non-inverting buck-boost converter, can include two separate control loop circuits to separately control operation of the buck circuit and the boost circuit. The control loop circuits may include two different voltage reference signals, two different current reference signals, two different current feedback signals, two different voltage feedback signals, or a combination thereof. The buck-boost converter circuit can operate in three modes: a buck mode, a transition mode, and a boost mode.

3 Claims, 12 Drawing Sheets

(56) References Cited

U.S. PATENT DOCUMENTS

| | | | |
|---|---|---|---|
| 2006/0284606 A1 | 12/2006 | Chen | |
| 2007/0075687 A1 | 4/2007 | Ishii | |
| 2008/0001587 A1 | 1/2008 | Cremoux | |
| 2009/0066301 A1* | 3/2009 | Oswald | H02M 3/1582 323/351 |
| 2010/0237836 A1 | 9/2010 | Fahrenbruch | |
| 2011/0001461 A1* | 1/2011 | Lu | H02J 7/0031 323/283 |
| 2011/0101944 A1 | 5/2011 | Uchiike | |
| 2012/0105038 A1* | 5/2012 | Chen | H02M 3/1582 323/283 |
| 2012/0313572 A1 | 12/2012 | Sheu | |
| 2013/0328534 A1 | 12/2013 | Hsieh | |
| 2014/0084882 A1* | 3/2014 | Namekawa | H02M 3/1582 323/271 |
| 2014/0152272 A1* | 6/2014 | Bazzani | H02M 3/1582 323/234 |
| 2014/0266110 A1 | 9/2014 | Yuan | |
| 2014/0354250 A1 | 12/2014 | Deng | |
| 2015/0022174 A1* | 1/2015 | Nikitin | H02M 3/157 323/282 |
| 2015/0256071 A1* | 9/2015 | Penzo | H05B 45/48 315/297 |
| 2017/0257031 A1* | 9/2017 | Shao | H02M 3/1582 |
| 2019/0131877 A1* | 5/2019 | Luff | H02M 1/08 |
| 2020/0091822 A1* | 3/2020 | Ou | H02M 3/1582 |

FOREIGN PATENT DOCUMENTS

| | | |
|---|---|---|
| CN | 107809182 A | 3/2018 |
| CN | 108306489 A | 7/2018 |
| CN | 108923410 A | 11/2018 |
| CN | 110048607 A | 7/2019 |
| CN | 111245242 A | 6/2020 |
| EP | 1146629 A2 | 10/2001 |
| JP | 2016226106 A | 12/2016 |
| KR | 101977534 B1 | 5/2019 |
| TW | 201703411 A | 1/2017 |
| TW | 201725837 A | 7/2017 |

OTHER PUBLICATIONS

Single-channel low-side MOSFET gate driver IC with fast OCP; Infineon Technologies AG; 2020; 20 pages.
Vijay Choudhary, et al., Under the Hood of a Noninverting Buck-Boost Converter; Texas Instruments; Power Supply Design Seminar 2016/2017; 25 pages.
International Search Report and Written Opinion for PCT Application No. PCT/CN2021/0142317, filed Dec. 29, 2021; dated May 2, 2022; 13 pages.

* cited by examiner

NON-INVERTING BUCK-BOOST CONVERTER

BACKGROUND

A buck-boost converter is a type of switched power converting circuit that combines the circuits of a buck converter (used to achieve a lower output voltage than the input voltage) and a boost converter (used to achieve a higher output voltage than the input voltage). A buck-boost converter can provide a regulated direct current (DC) output as the input voltage varies above or below the output voltage.

Further, a non-inverting buck-boost converter can have four active switches to implement both step-down and step-up power conversion using only one inductor and can provide an output voltage with the same polarity as the input voltage. To improve the efficiency, it is suitable to control the converter to operate in buck mode when the input voltage is greater than the output voltage and in boost mode when the input voltage is less than the output voltage.

However, the performance of the converter can be degraded when the input voltage approaches the output voltage due to the occurrence of an operational dead zone, which can degrade an operational performance of the converter when the converter shifts from buck operating mode to boost operating mode. This is because the duty ratio of the switches is hard to generate in the ranges of zero percent to minimum duty (>0%) and maximum duty (<100%) to hundred percent in practical applications. In this case, the converter will swing between the buck mode and boost mode resulting in increased output voltage ripples and potential unstable operation. The embodiments described herein provide solutions to these problems.

SUMMARY

In certain embodiments, a buck-boost converter circuit can include an input configured to receive an input voltage, an output configured to provide an output voltage, a buck circuit having a first power switch and a first power diode coupled in series between the input and a ground reference, a boost circuit having a second power switch and a second power diode coupled in series between the output and the ground reference, a first feedback control circuit coupled between the output and the buck circuit, the first feedback control circuit configured to switch the buck circuit on and off based on a first reference voltage, and a second feedback control circuit coupled between the output and the boost circuit, the second feedback control circuit configured to switch the boost circuit on and off based on a second reference voltage. The first feedback control circuit and the second feedback control circuit are configured to avoid overlap operation of both the buck circuit and the boost circuit during a transition from a buck mode to a boost mode and vice versa.

In certain embodiments, a buck-boost converter circuit can comprise an input configured to receive an input voltage, an output configured to provide an output voltage, a buck circuit having a first power switch and a first power diode coupled in series between the input and a ground reference, a boost circuit having a second power switch and a second power diode coupled in series between the output and the ground reference, a first feedback control circuit coupled between the output and the buck circuit, the first feedback control circuit configured to switch the buck circuit on and off based on a first feedback voltage and a first reference voltage, and a second feedback control circuit coupled between the output and the boost circuit, the second feedback control circuit configured to switch the boost circuit on and off based on a second feedback voltage and the first reference voltage. The first feedback control circuit and the second feedback control circuit are configured to avoid overlap operation of both the buck circuit and the boost circuit during a transition from a buck mode to a boost mode and vice versa.

In certain embodiments, a buck-boost converter circuit can include an input configured to receive an input voltage, an output configured to provide an output voltage, a buck circuit having a first power switch and a first power diode coupled in series between the input and a ground reference, a boost circuit having a second power switch and a second power diode coupled in series between the output and the ground reference, a first feedback control circuit coupled between the output and the buck circuit, the first feedback control circuit configured to switch the buck circuit on and off, and a second feedback control circuit coupled between the output and the boost circuit, the second feedback control circuit configured to switch the boost circuit on and off. The first feedback control circuit and the second feedback control circuit are configured to avoid overlap operation of both the buck circuit and the boost circuit during a transition from a buck mode to a boost mode and vice versa.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

The solutions provided herein use two separate control loops with either two different reference signals or two different feedback signals to avoid overlap operation of the buck and boost during the transition from buck operation to boost operation. By avoiding an overlap of the operation of the buck and boost, there is no sudden change or increase of the inductor ripple current during the transition; thus, does not need to increase the inductance of the converter to counter-act an increase in current ripple. Further, with lower inductance, higher efficiency can be achieved due to less windings which means less DC resistance loss. Also, lower inductance can result in a smaller physical size and a higher power density can be achieved due to smaller printed circuit board (PCB) size requirement. Further, by avoiding the overlap of operations, the double-effect of switching loss can be eliminated and, thus, degradation of efficiency during transition mode is avoided. Lower switching loss in the switches can allow for a smaller heatsink requirement, which could then further increase the power density. The solutions described herein can be implemented using discrete analog circuits or integrated circuits.

Figure 1:
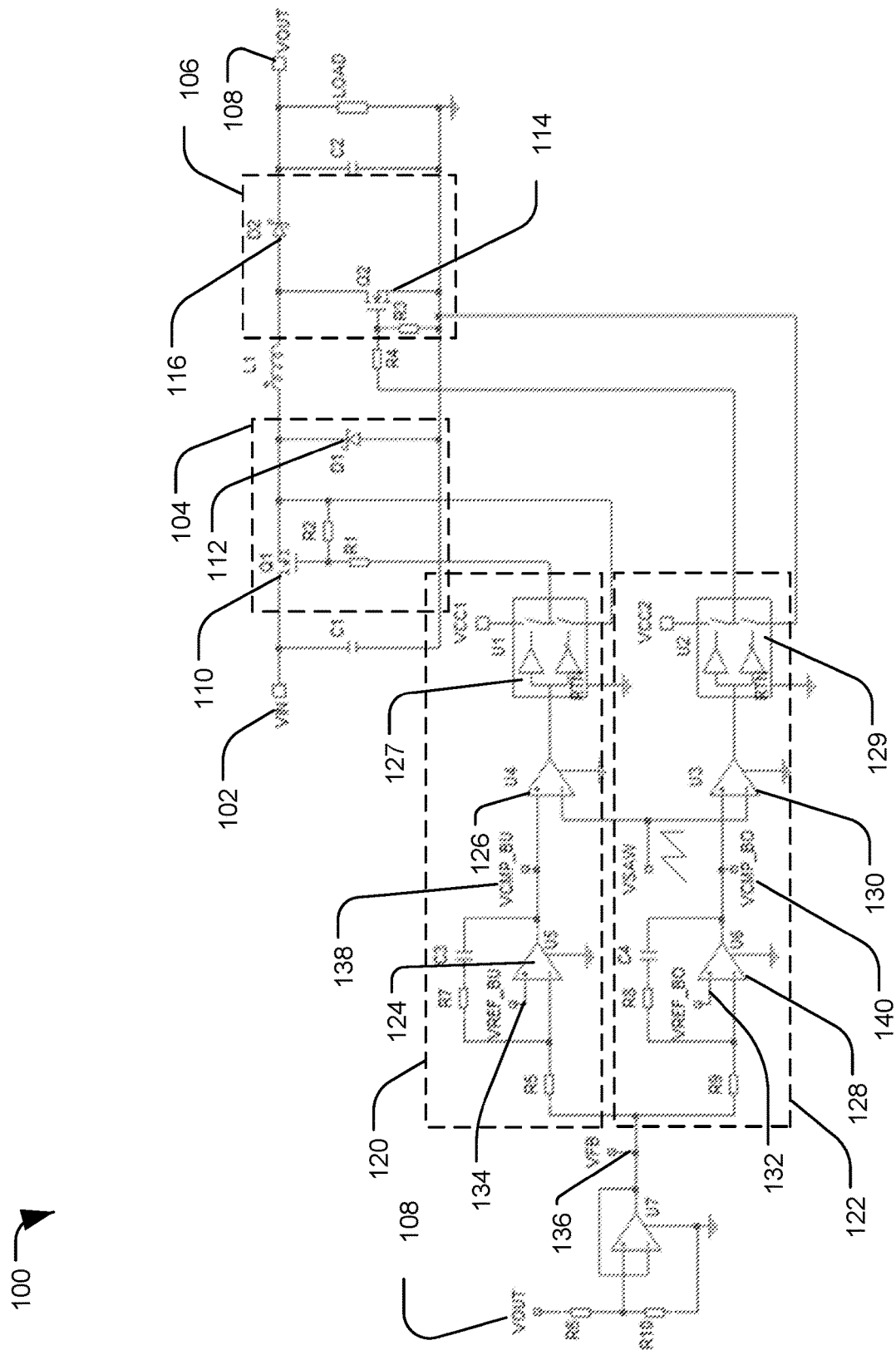
FIG. 1 is a schematic diagram of a non-inverting buck-boost converter circuit with voltage-mode control, in accordance with certain embodiments of the present disclosure.

FIG. 1 is a schematic diagram of a non-inverting buck-boost converter circuit with voltage-mode control, generally designated 100. The non-inverting buck-boost converter circuit 100 may include a buck circuit 104 and a boost circuit 106, each coupled to a voltage input 102 and a voltage output 108. The buck circuit 104 may comprise a first switch 110 and a first power diode 112 configured to lower the input voltage when it is higher than the needed output voltage. The boost circuit may comprise a second switch 114 and a second power diode 116 configured to boost the input voltage when it is lower than the needed output voltage. In some embodiments, both the first switch 110 and the second switch 114 may be PNP (Positive-Negative-Positive) transistors and both the first power diode 112 and the second power diode 116 may be Schottky diodes.

The circuit 100 may also include a buck feedback circuit 120 and a boost feedback circuit 122. The buck feedback circuit 120 can include a first comparator 124 and a second comparator 126. The boost feedback circuit 122 can include a third comparator 128 and a fourth comparator 130. A sawtooth signal may be provided at the negative inputs of the second comparator 126 and the fourth comparator 130, which can generate a pulse width modulated output of each respective comparator in certain situations, as described herein.

Figure 2:
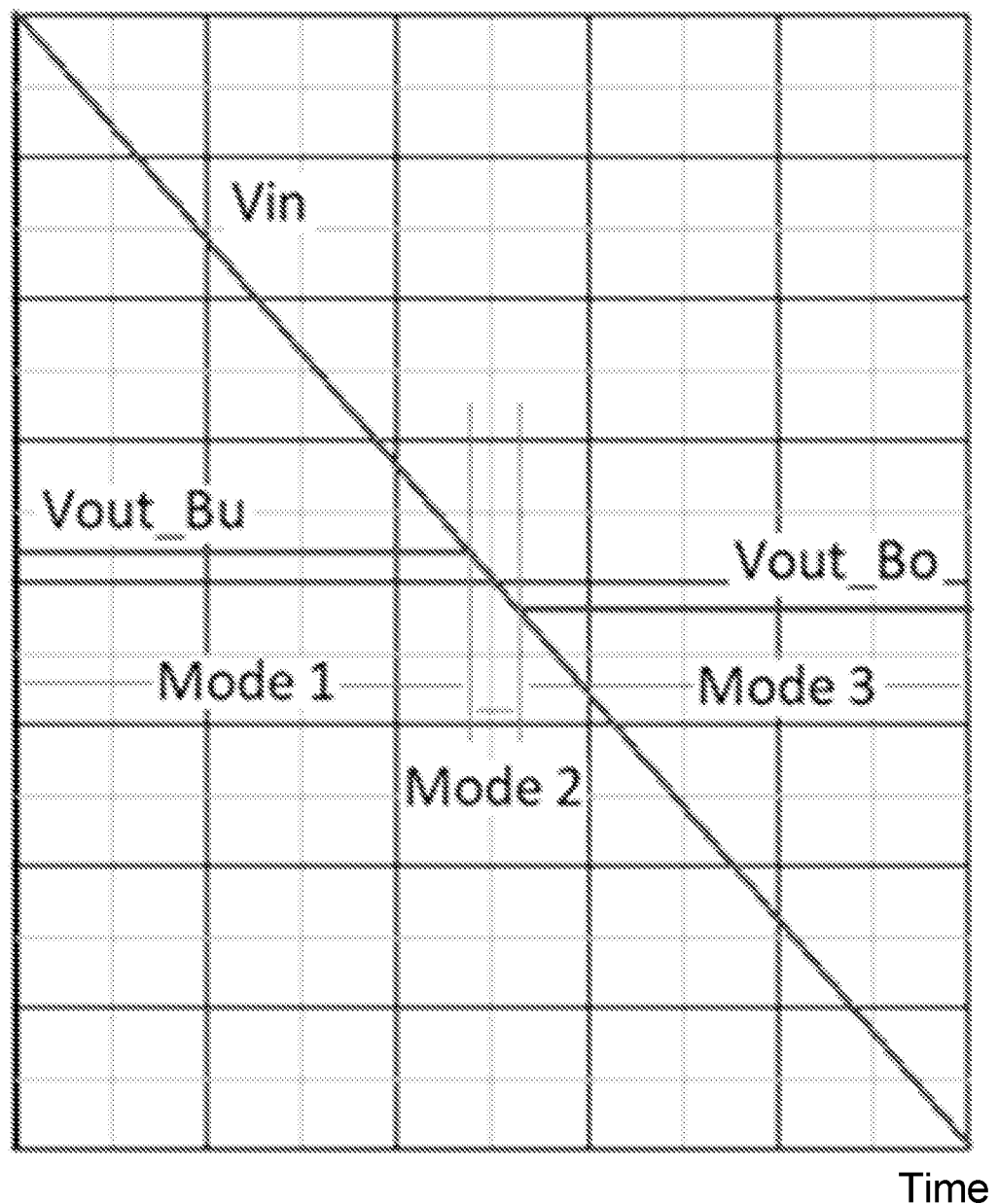
FIG. 2 is a graph of voltage input and output over time of a non-inverting buck-boost converter circuit, in accordance with certain embodiments of the present disclosure.

When the input voltage (VIN) is greater than the output voltage (VOUT), the buck-boost circuit 100 will operate as buck converter to step down the VIN to the VOUT, that is, to reduce the output voltage to below the input voltage. For example, as shown in FIG. 2, at Mode 1, VOUT=Vout_Bu, where Vout_Bu is the output voltage regulation when the buck-boost circuit 100 is operating in buck mode. When at Mode 1 of FIG. 2 (buck mode), the boost switch 114 will always be off while the boost diode 116 will be conducting continuously. The boost switch 114 will be off due to the feedback loop control 122 of the boost circuit 106 based on the level of the boost reference voltage (VREF_BO) 132. In some embodiments, VREF_BO 132 can be slightly lower than the buck reference voltage (VREF_BU) 134. Further, VREF_BO 132 and VREF_BU 134 may be independent reference voltage signals. For example, the reference voltages may be based on a specification for output voltage setpoints. In some specific examples, the voltage reference for the boost can be set at 47.4V while the voltage reference for the buck can be set at 47.6V.

When the buck circuit 104 is regulating the output voltage 108, the feedback voltage (VFB) 136 is equal to VREF_BU 134 because the boost feedback loop 122 is also using the same VFB signal 136; thus, VFB 136 seen by the boost feedback loop 122 is greater than VREF_BO 132, which causes the third comparator's 128 output voltage (VCMP_BO) 140 to be low and the output of the fourth comparator 130 then will also be low, keeping the second switch 114 always off when in buck mode. This can be implemented via a MOSFET (metal-oxide-semiconductor field-effect transistor) gate driver 129, such as a complementary MOSFET gate driver, that can provide a transition from a fully-off to a fully-on state based on the output of the fourth comparator 130, which allows the MOSFET gate driver 129 to control the second switch 114.

When the input voltage (VIN) is less than the output voltage (VOUT), the buck-boost circuit 100 will operate as boost converter to step up the voltage from VIN to VOUT, that is, to increase the input voltage to the output voltage. For example, as shown in FIG. 2, at Mode 3, VOUT=Vout_Bo, where Vout_Bo is the output voltage regulation when the buck-boost circuit 100 is operating in boost mode. When in Mode 3 of FIG. 2 (boost mode), the buck switch 110 will always be on but the buck diode 112 will always be reverse-biased. The buck switch 110 will be on continuously due to the feedback loop control 120 of the buck circuit 104 based on the level of buck reference voltage (VREF_BU) 134. In some embodiments, VREF_BU 134 can be slightly higher than VREF_BO 132.

When the boost circuit 106 is regulating the output voltage 108, VFB 136 is equal to VREF_BO 132 because the buck feedback loop 120 is also using the same VFB signal; thus, VFB 136 seen by the buck feedback loop 120 is less than VREF_BU 134, which causes the first comparator's 124 output (VCMP_BU) 138 to be high and the output of the second comparator 126 then will also be high, keeping the first switch 110 always on. This can be implemented via a MOSFET gate driver 127, such as a complementary MOSFET gate driver, that can provide a transition from a fully-off to a fully-on state based on the output of the second comparator 127, which allows the MOSFET gate driver 127 to control the first switch 110.

When the input voltage is lower than an output regulation voltage (e.g., Vout_Bu) of the buck circuit 104 but is greater than the output regulation voltage (e.g., Vout_Bo) of the boost circuit 106, the output voltage will follow the input voltage. The output regulation voltage of the buck circuit 104 can be a pre-determined voltage value that turns the buck converter circuit 104 off when the input voltage drops below the voltage value. The output regulation voltage of the boost circuit 106 can be a pre-determined voltage value that turns the boost converter circuit 106 on when the input voltage drops below the voltage value. Thus, as depicted in FIG. 2, at Mode 2, VOUT=VIN as both the buck circuit 104 and the boost circuit 106 are off.

To accomplish this, when in Mode 2, the first switch 110 will transition from switching to continuously switched on and the second power diode 116 will be continuously conducting; thus, VOUT will be substantially equal to VIN (e.g., neglecting any drop due to the resistance when the first switch 110 is in saturation (RDS(on)) and the forward voltage drop of the second power diode 116).

In some examples, the input voltage could be provided by a battery, such as a battery backup unit to a computer system, that continues to decay (discharge) as shown in FIG. 2. As shown, VOUT 108 will follow VIN 102, without the circuit 100 providing a reduction to VIN 102 and without a boost to VIN 102, until VOUT 108 drops to the level of Vout_Bo, which will then naturally activate the boost circuit 106 (going to Mode 3) to regulate the output voltage at Vout_Bo as the input voltage continues to decay below Vout_Bo.

Figure 3:
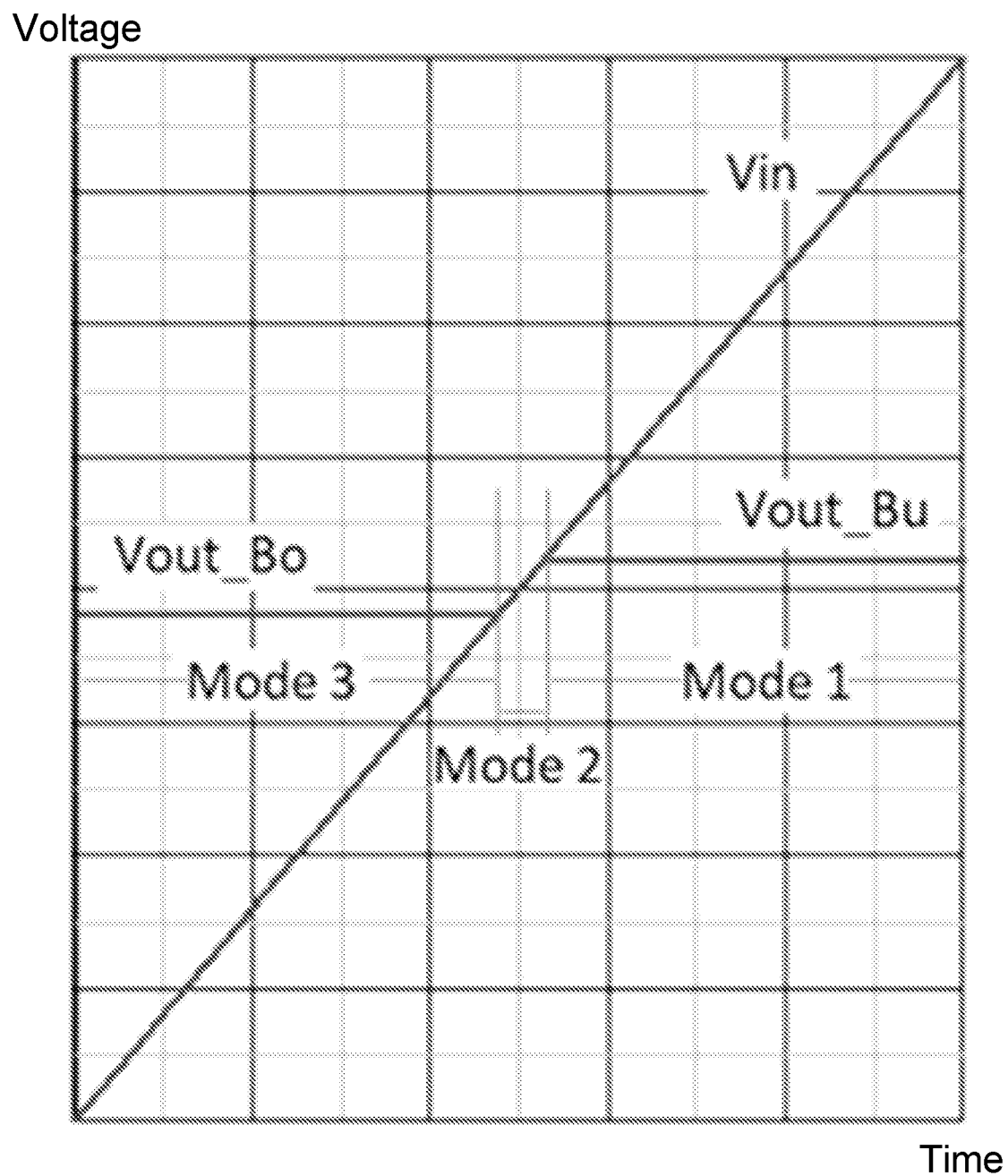
FIG. 3 is a graph of voltage input and output over time of a non-inverting buck-boost converter circuit, in accordance with certain embodiments of the present disclosure.

In some examples, the input voltage may be increasing over time, as shown in FIG. 3. When the circuit 100 is in Mode 2, the first switch 110 will conduct continuously and the second power diode 116 will transition from switching to conducting continuously; thus, VOUT will be substantially equal to VIN (e.g., neglecting any drop due to the resistance when the first switch 110 is in saturation (RDS(on)). As the input voltage, such as from a battery backup unit, increases VOUT will continue to follow VIN until VOUT reaches the level of Vout_Bu then the buck circuit 104 will naturally activate (going to Mode 1) and regulate the output voltage at Vout_Bu as the input voltage continues to increase above Vout_Bu.

Figure 4:
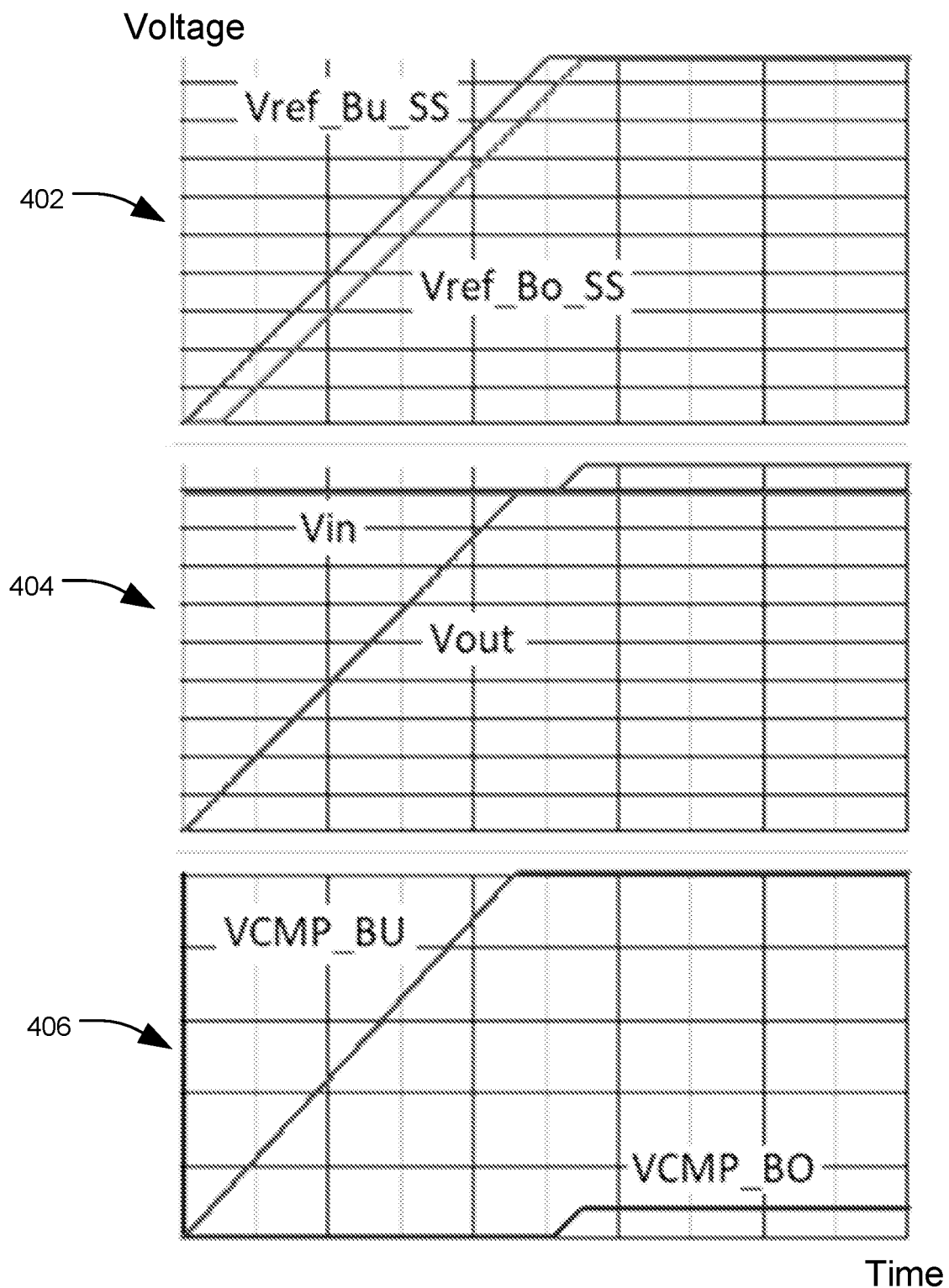
FIG. 4 is a graph of start-up sequences of a non-inverting buck-boost converter circuit, in accordance with certain embodiments of the present disclosure.

Referring to FIG. 4, a series of graphs of start-up sequences of a non-inverting buck-boost converter circuit 100 are shown. FIG. 4 shows an embodiment of a soft-start during a start-up sequence. To achieve a monotonic rise of the output voltage during start-up, as shown in the second graph 404, the soft-start of VREF_BU 134 and VREF_BO 132 can be sequenced, as shown in the first graph 402. In some examples, VREF_BU 134 may be implemented prior to VREF_BO 132 being implemented. During a start-up condition, regardless of VIN>VOUT regulation or VIN<VOUT regulation, VREF_BU 134 can start first, then with a certain delay, VREF_BO 132 can follow. The third graph 406 shows an example of the response of individual error-amplifier outputs (VCMP_BU 138 & VCMP_BO 140) from the VREF softstarts of VREF_BU 134 and VREF_BO 132.

Figure 5:
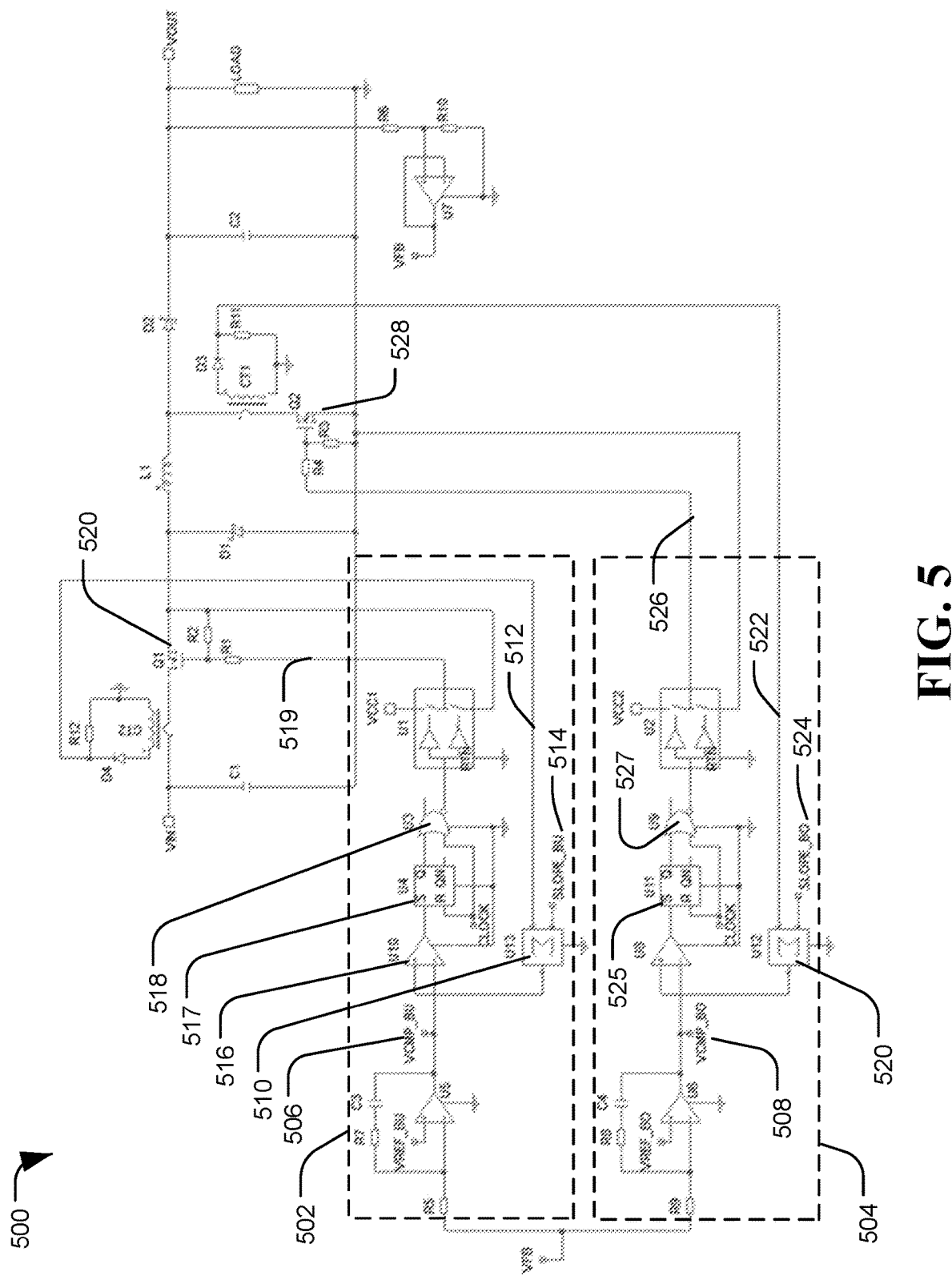
FIG. 5 is a schematic diagram of a non-inverting buck-boost converter circuit with peak-current-mode control, in accordance with certain embodiments of the present disclosure.

Referring to FIG. 5, a schematic diagram of a non-inverting buck-boost converter circuit with peak-current mode PWM control is shown and generally designated 500. The circuit 500 works similarly to the circuit 100 in providing a buck circuit and a boost circuit; however, the control feedback loops 502 and 504 can each utilize a separate sum of an inductor peak current instead of a sawtooth signal to generate a duty cycle.

In a specific embodiment, when in buck mode, VCMP_BU 506 is compared to the sum (output of summing circuit 510) of the inductor peak current 512 and buck slope compensation (SLOPE_BU) 514 to generate a duty signal 519 for the buck switch 520. The duty signal 519 can be generated based on logic gates, such as a solid-state logic gate S-R latch circuit 517 and logic 518, as depicted. When in boost mode, VCMP_BO 508 is compared to the sum (output of summing circuit 520) of the inductor peak current 522 and boost slope compensation (SLOPE_BO) 524 to generate a duty signal 526 for the boost switch 528. The duty signal 526 can be generated based on logic gates, such as a solid-state logic gate S-R latch circuit 525 and logic 527, as depicted. Logic 518 and 527 can implement a trailing-edge PWM signal for peak-current-mode control.

Figure 6:
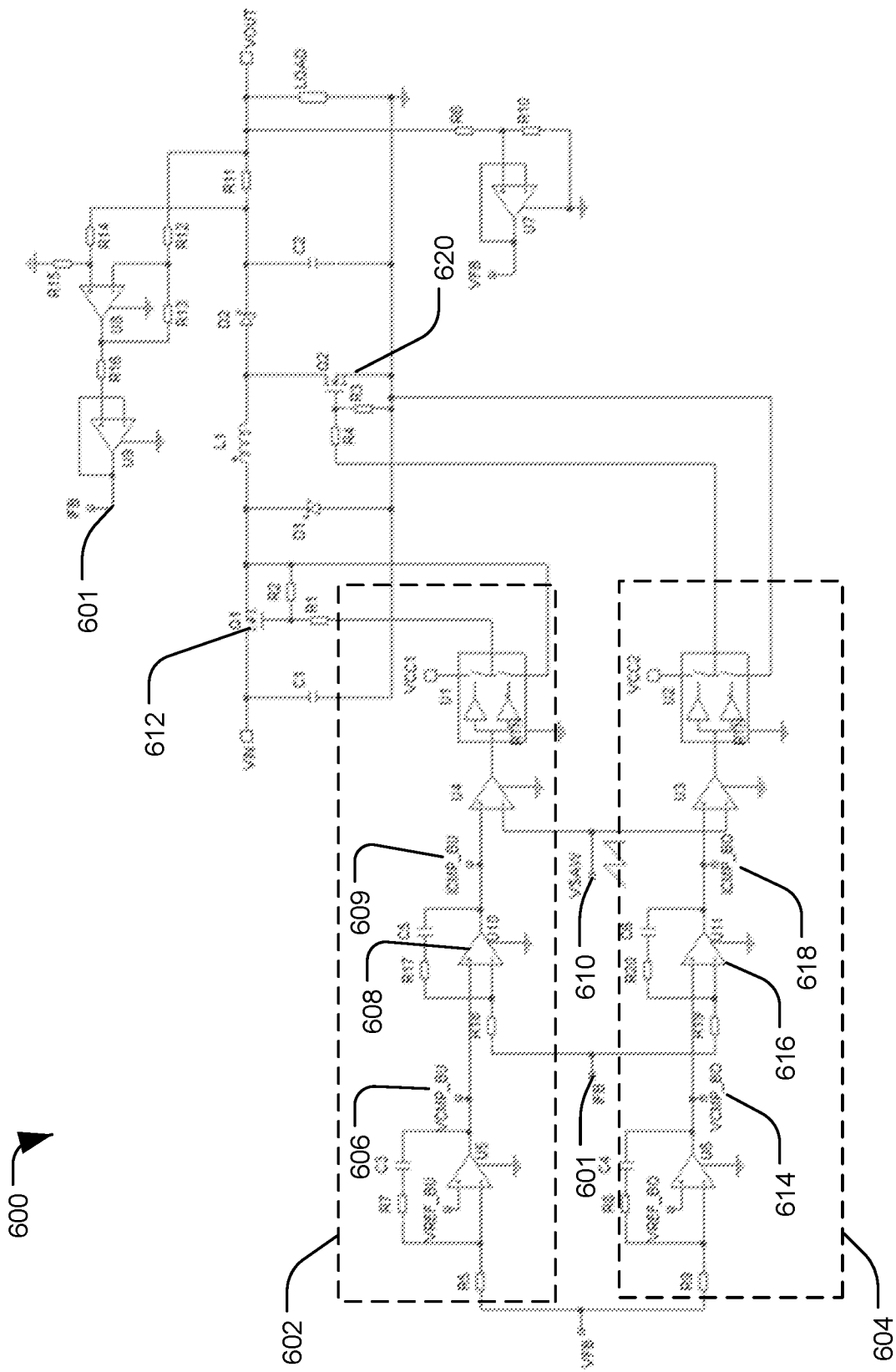
FIG. 6 is a schematic diagram of a non-inverting buck-boost converter circuit with average-current-mode control, in accordance with certain embodiments of the present disclosure.

Referring to FIG. 6, a schematic diagram of a non-inverting buck-boost converter circuit with average-current PWM mode control is shown and generally designated 600. The circuit 600 works similarly to the circuit 100 in providing a buck circuit and a boost circuit; however, the control feedback loops 602 and 604 can each utilize a current feedback signal 601 to generate a duty cycle.

In a specific embodiment, when in buck mode, VCMP_BU 606 is used as reference to the buck current loop error amplifier 608, which has an output (ICMP_BU) 609 that is used to compare to an artificial sawtooth signal (VSAW) 610 to generate a duty signal for the buck switch 612. When in boost mode, VCMP_BO 614 is used as reference to the boost current-loop error amplifier 616, which has an output (ICMP_BO) 618 that is used to compare to the VSAW 610 to generate a duty signal for the boost switch 620.

Figure 7:
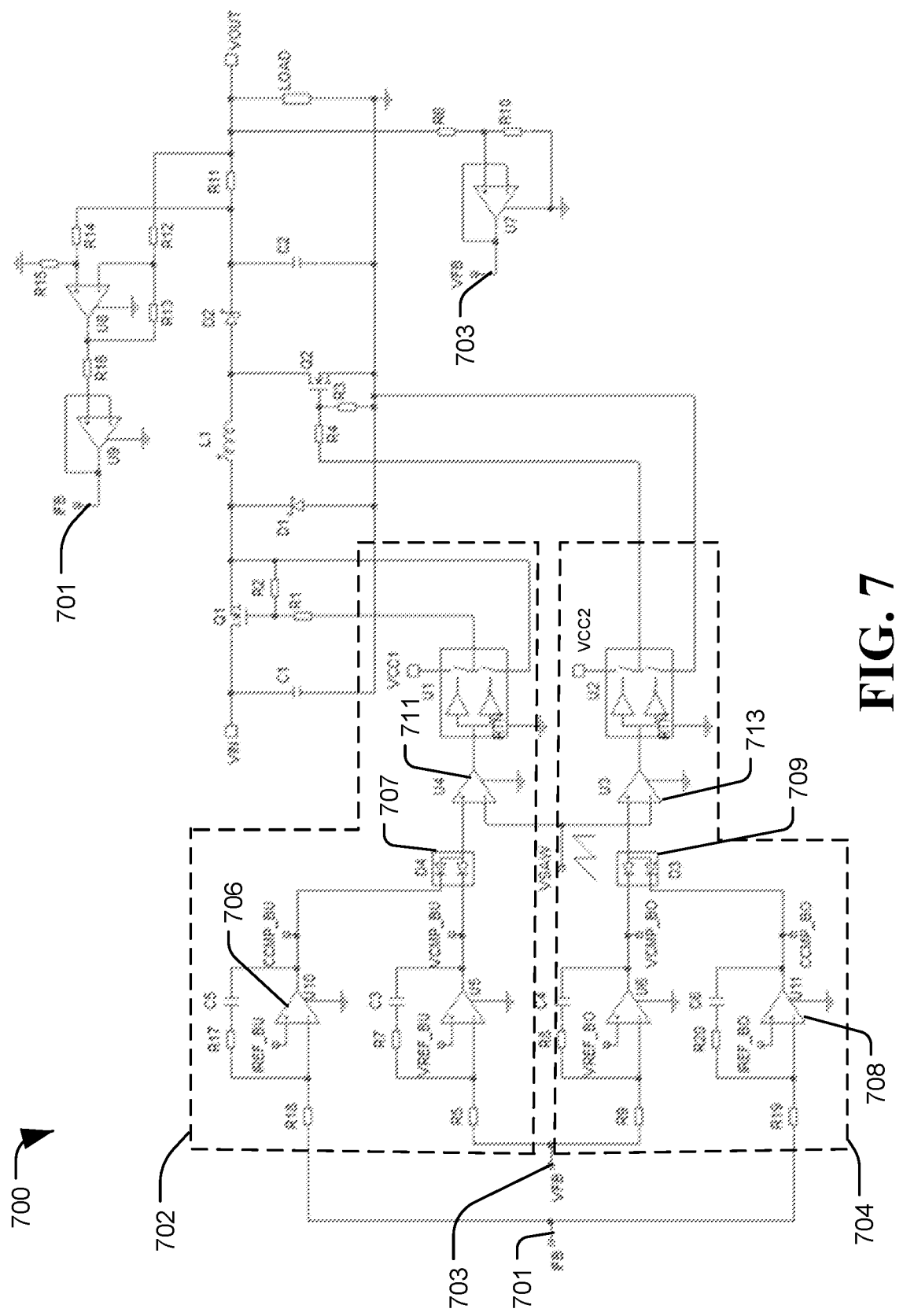
FIG. 7 is a schematic diagram of a non-inverting buck-boost converter circuit with voltage-mode control with constant-current-mode, in accordance with certain embodiments of the present disclosure.

Referring to FIG. 7, a schematic diagram of a non-inverting buck-boost converter circuit with voltage mode PWM control and constant current mode is shown and generally designated 700. The circuit 700 works similarly to the circuit 100 in providing a buck circuit and a boost circuit; however, the control feedback loops 702 and 704 can switch between utilizing a current feedback signal 701 or a voltage feedback signal 703 to generate a duty cycle.

In a specific embodiment, the circuit 700 can have a current loop control in order to operate in a constant-current mode. The current loop control can be implemented by the comparators 706 and 708 configured to compare the current feedback signal 701 to current reference signals.

For example, when the circuit 700 is utilized where a constant current output is needed, such as to charge a battery (not shown, but at VOUT), the circuit 700 can operate in CC mode. In CC mode, when the input voltage is greater than the output voltage the circuit 700 will operate in buck mode. The battery voltage can be sensed by the control loops 702 and 704 through VFB. VFB is lower compared to both VREF_BU and VREF_BO because the circuit 700 is in CC mode, therefore VCMP_BU and VCMP_BO are both high. When VCMP_BU and VCMP_BO are both high, they become slave to CCMP_BU and CCMP_BO, respectively, which dictate the final duty signal. The closed-loop operation of the CC mode is in the buck control loop 702. When the current reference of the buck control circuit 702 (IREF_BU) is set slightly higher than the current reference of the boost control circuit 704 (IREF_BO) for a closed-loop operation, IFB is greater than IREF_BO, therefore CCMP_BO is low and dictates the final duty signal. This will cause the duty of the boost switch to be at 0% or it is fully off.

When still in CC mode and the battery voltage has been charged, when the battery voltage is equal to the input voltage, the output current will start to decrease and the CC mode will shift from buck CC mode to boost CC mode because the IREF_BO is lower than the IREF_BU.

In some embodiments, for the buck control circuit 702, switching between CC mode and voltage control mode can be implemented by providing VCMP_BU and CCMP_BU (the output of comparator 706) to the input of the PWM switching comparator 711. The signals VCMP_BU and CCMP_BU may be passed through diodes, such as could be in a diode package 707, to determine which signal is to be provided. The output of the diode package 707, which is either VCMP_BU or CCMP_BU, can be provided to the PWM switching comparator 711 that is also configured to receive a sawtooth signal to generate a duty cycle for the boost power switch.

For the boost control circuit 704, switching between CC mode and voltage control mode can be implemented by providing VCMP_BO and CCMP_BO (the output of comparator 708) to the input of the PWM switching comparator 713. The signals VCMP_BO and CCMP_BO may be passed through diodes, such as could be in a diode package 709, to determine which signal is to be provided. The output of the diode package 709, which is either VCMP_BO or CCMP_BO, can be provided to the PWM switching comparator 711 that is also configured to receive a sawtooth signal to generate a duty cycle for the buck power switch. The diodes within diode package 707 and diode package 709 can be implemented as separate electronic components, in a single package, or in multiple packages.

Figure 8:
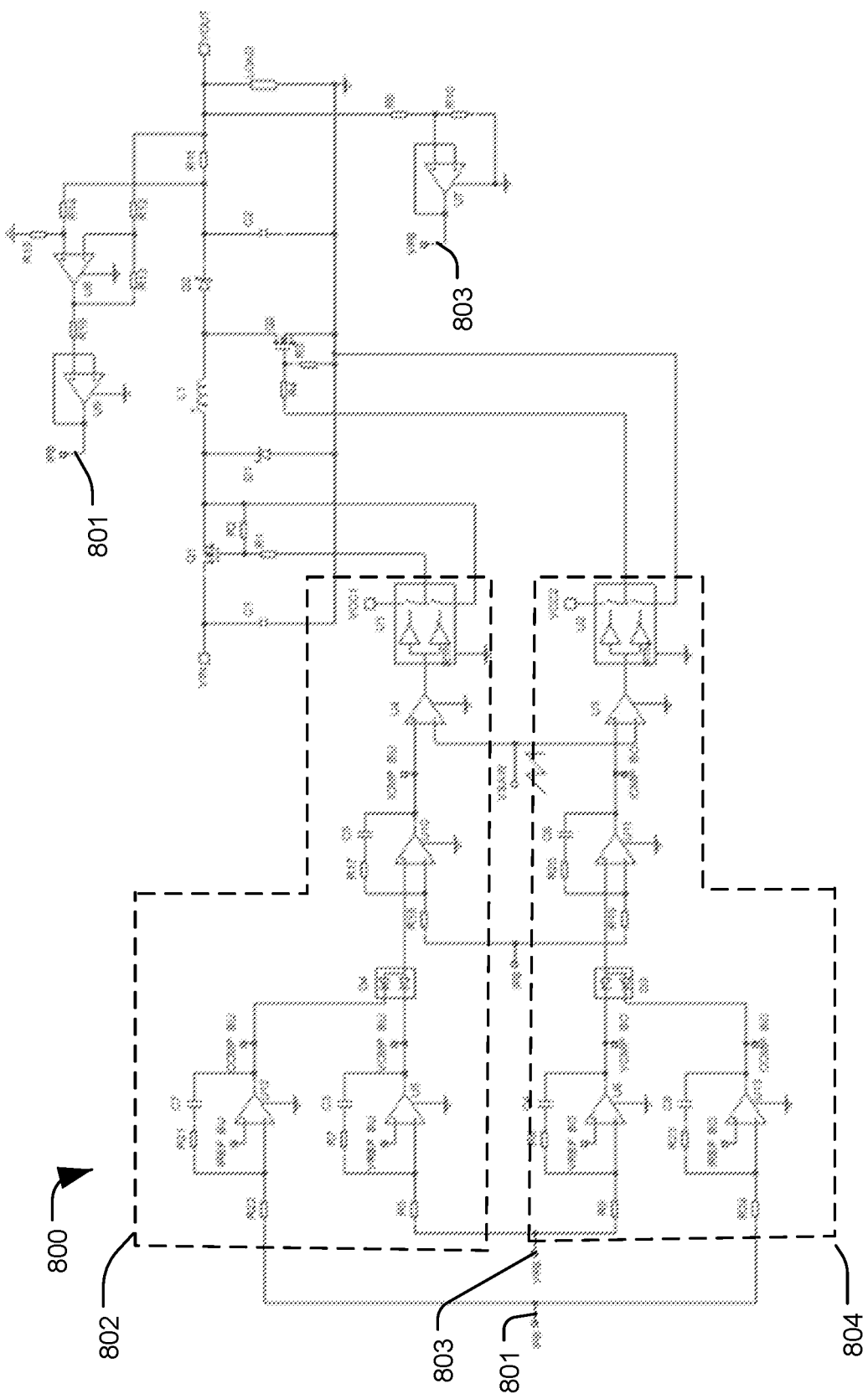
FIG. 8 is a schematic diagram of a non-inverting buck-boost converter circuit with average-current-mode control with constant-current-mode, in accordance with certain embodiments of the present disclosure.

Referring to FIG. 8, a schematic diagram of a non-inverting buck-boost converter circuit with average-current mode PWM control and constant current mode is shown and generally designated 800. The circuit 800 works similarly to the circuits 100 and 700 in providing a buck circuit and a boost circuit, where the control feedback loops 802 and 804 can switch between utilizing a current feedback signal 801 or a voltage feedback signal 803 to generate a duty cycle. This modification shows the constant current (CC) mode can also be integrated with an average-current mode PWM control, such as shown in FIG. 6.

Figure 9:
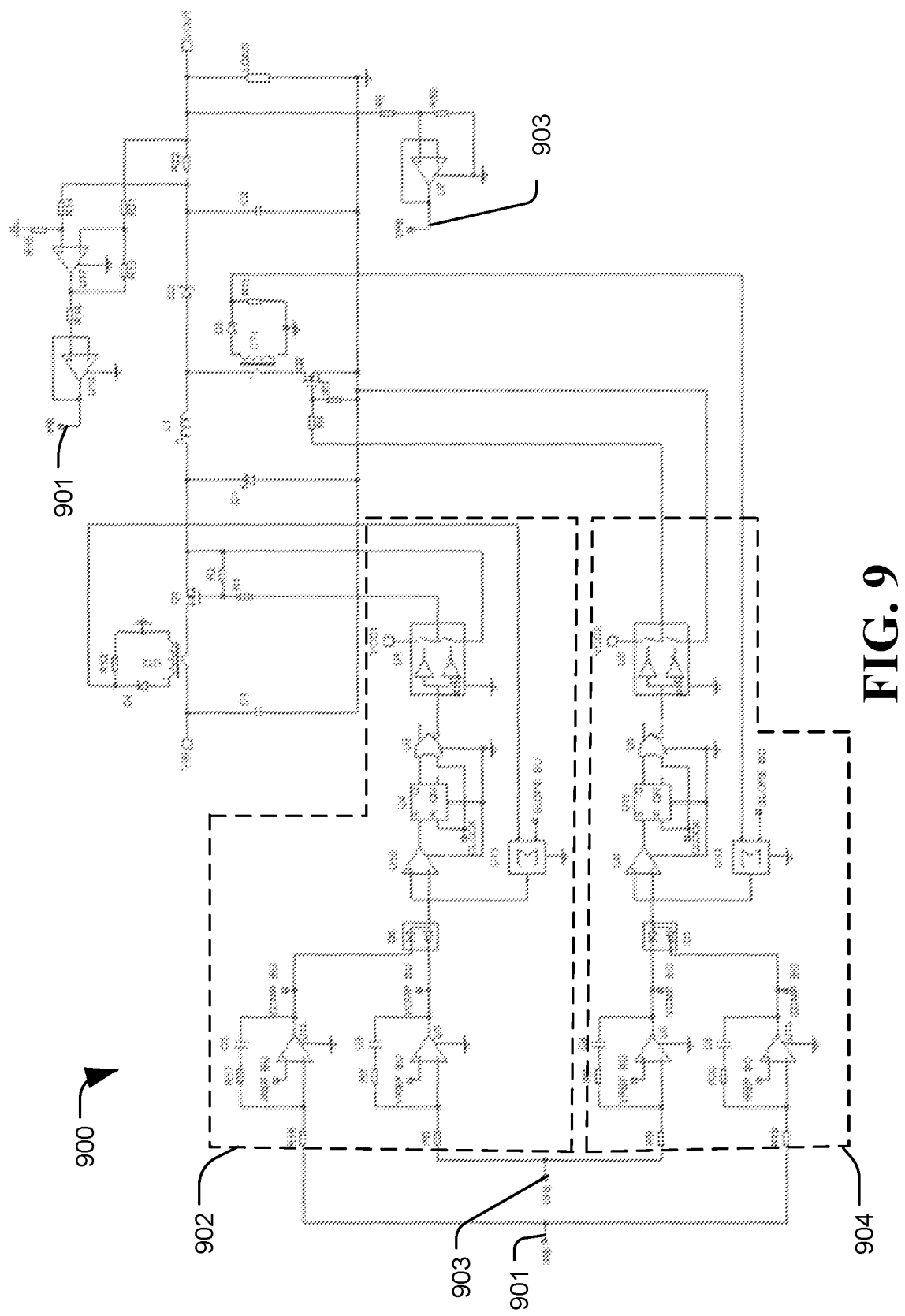
FIG. 9 is a schematic diagram of a non-inverting buck-boost converter circuit with peak-current-mode control with constant-current-mode, in accordance with certain embodiments of the present disclosure.

Referring to FIG. 9, a schematic diagram of a non-inverting buck-boost converter circuit with peak-current mode PWM control and constant current mode is shown and generally designated 900. The circuit 900 works similarly to the circuits 100 and 700 in providing a buck circuit and a boost circuit, where the control feedback loops 902 and 904 can switch between utilizing a current feedback signal 901 or a voltage feedback signal 903 to generate a duty cycle. This modification shows the constant current mode can also be integrated with a peak-current mode PWM control, such as shown in FIG. 5.

Figure 10:
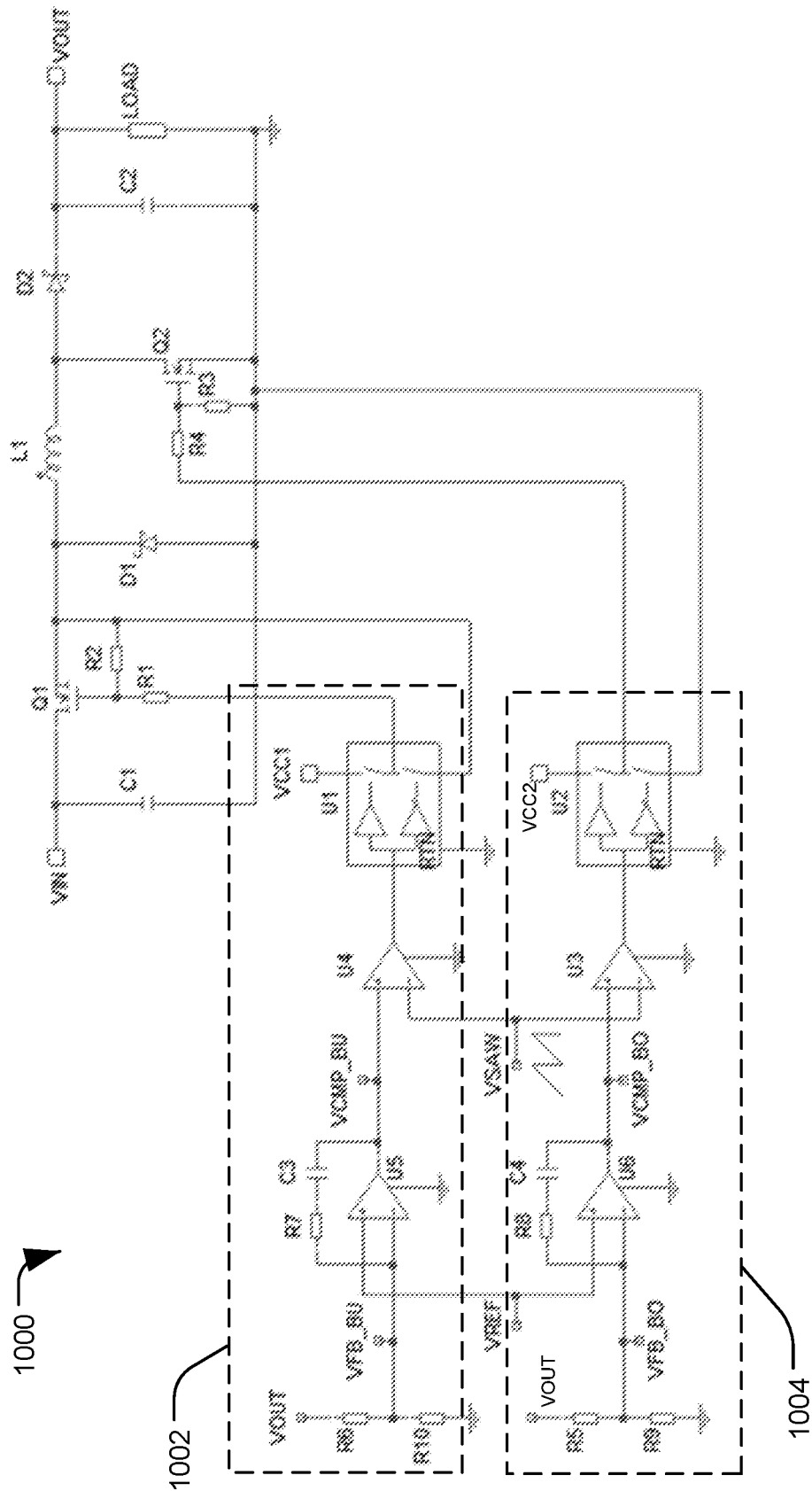
FIG. 10 is a schematic diagram of a non-inverting buck-boost converter circuit with voltage-mode control, in accordance with certain embodiments of the present disclosure.

Referring to FIG. 10, a schematic diagram of a non-inverting buck-boost converter circuit with voltage mode PWM control is shown and generally designated 1000. The circuit 1000 works similarly to the circuit 100 in providing a buck circuit and a boost circuit, but the feedback control loops 1002 and 1004 can utilize two different voltage feedbacks (VFB_BU & VFB_BO) instead of using two different voltage references (VREF_BU & VREF_BO, as in FIG. 1); and the voltage reference (VREF) can be common to both feedback control loops 1002 and 1004.

When in buck mode, the output voltage regulation may be slightly higher compared to the output voltage regulation when in boost mode. This is achieved by using appropriate values for the feedback resistors (R6 & R10). When in boost mode, the output voltage regulation can be slightly lower compared to the output voltage regulation when in buck mode. This is achieved by using appropriate values for the feedback resistors (R5 & R9).

Figure 11:
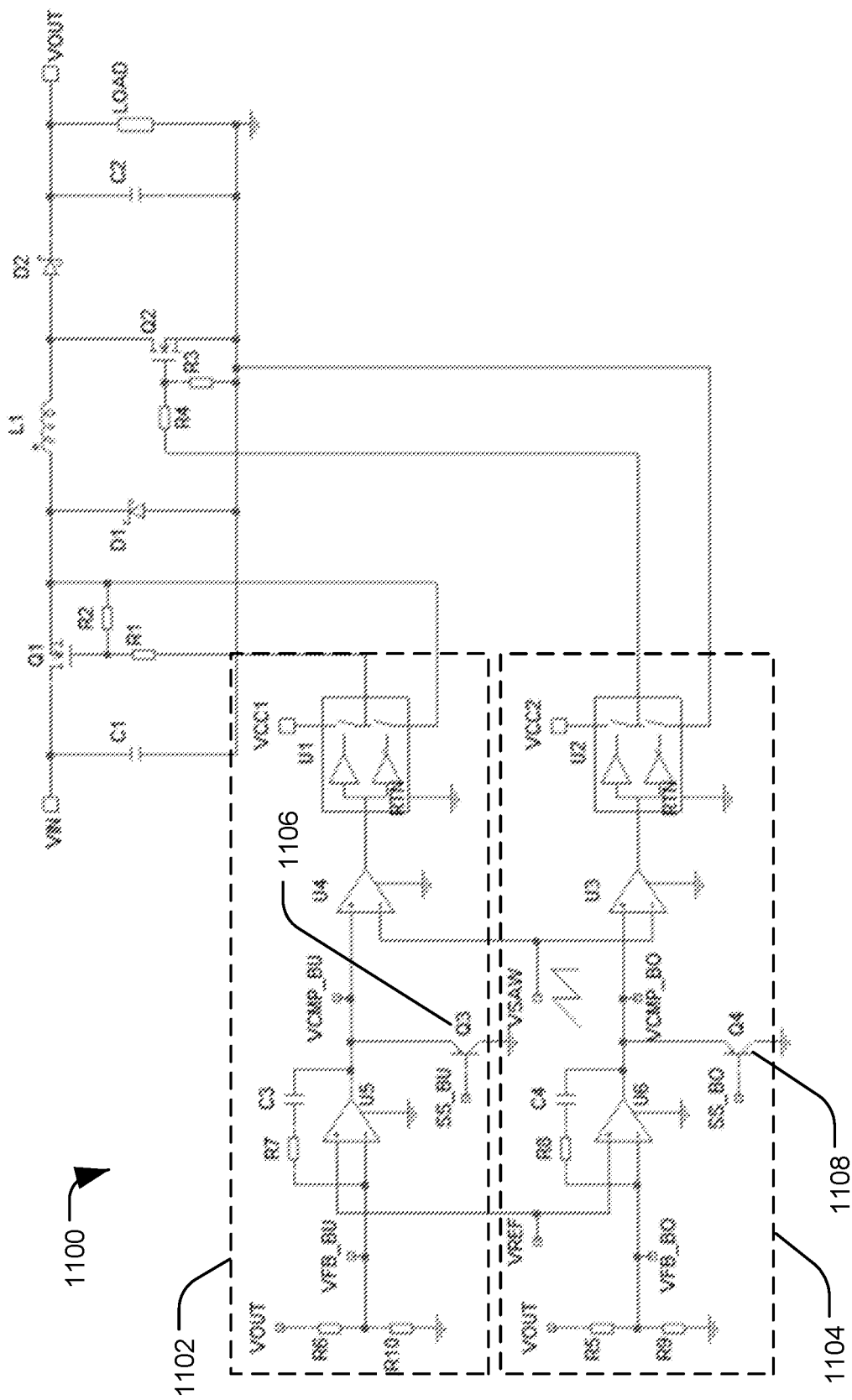
FIG. 11 is a schematic diagram of a non-inverting buck-boost converter circuit with average-current-mode control, in accordance with certain embodiments of the present disclosure.

Referring to FIG. 11, a schematic diagram of a non-inverting buck-boost converter circuit with voltage mode PWM control is shown and generally designated 1000. The circuit 1000 works similarly to the circuit 100 and the circuit 1000 in providing a buck circuit and a boost circuit, where the feedback control loops 1102 and 1104 can utilize two different voltage feedbacks (VFB_BU & VFB_BO) instead of using two different voltage references (VREF_BU & VREF_BO, as in FIG. 1); and the voltage reference (VREF) can be common to both feedback control loops 1102 and 1104.

Further, during a start-up condition, circuit 1100 can implement a soft-start through sequentially releasing (such as by applying voltage to SS_BU and open (turn off) the transistor 1106 to stop current from flowing to ground and instead provide U5's output to U4's input) VCMP_BU and VCMP_BO. During the start-up condition, regardless of VIN>VOUT regulation or VIN<VOUT regulation, VCMP_BU should be released first (through SS_BU and transistor 1106). VCMP_BO should be released after the soft-start period of VCMP_BU is finished (through SS BO and transistor 1108), similarly as shown in graph 406. Since the circuit 1100 has individual pull-down transistors 1106 and 1108, the startup of VREF_BO can be delayed such that VCMP_BU has reached a steady state prior to VCMP_BO.

Figure 12:
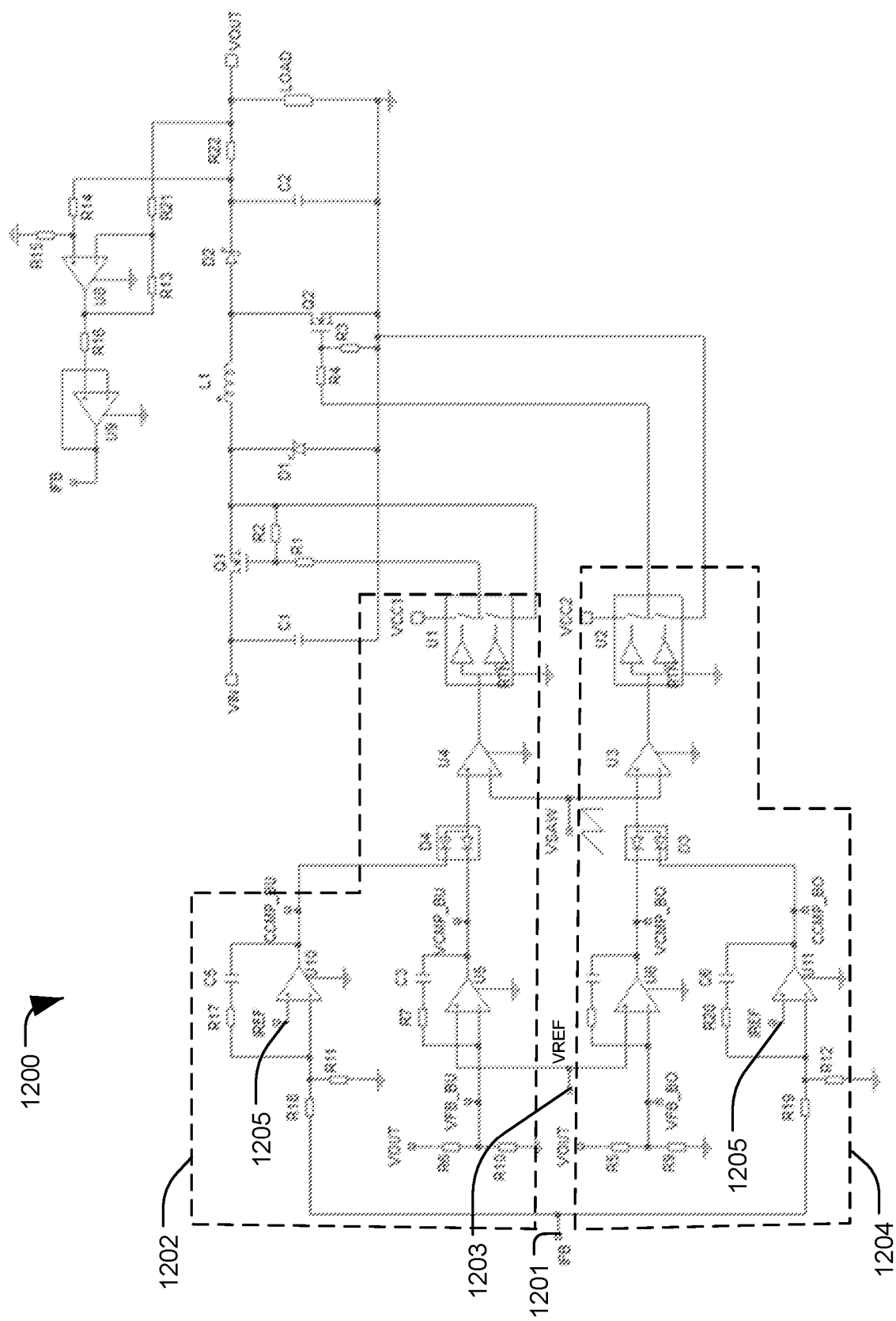
FIG. 12 is a schematic diagram of a non-inverting buck-boost converter circuit with voltage-mode control with constant-current-mode, in accordance with certain embodiments of the present disclosure.

Referring to FIG. 12, a schematic diagram of a non-inverting buck-boost converter circuit with voltage mode PWM control and constant current mode is shown and generally designated 1200. The circuit 1000 works similarly to the circuit 100 and circuit 700 in providing a buck circuit and a boost circuit, but the feedback control loops 1202 and 1204 can utilize two different voltage feedbacks (VFB_BU & VFB_BO) instead of using two different voltage references (e.g., VREF_BU & VREF_BO, as in FIG. 1 and FIG. 7); and the voltage reference (VREF) 1203 can be common to both feedback control loops 1002 and 1004.

In addition, the circuit 1200 can also include a constant current control, where instead of using two different current references (e.g., IREF_BU & IREF_BO, as in FIG. 7), a common current reference (IREF) 1205 can be used. In some embodiments, the individual current feedback that is going to each input of the current-loop error amplifiers, U10 for the buck and U11 for the boost can be slightly different from each other. For example, the current feedback going to U10 can be slightly higher as compared to the current feedback going to U11. Higher current feedback going to U10 can be achieved by using appropriate values for divider resistors R18 and R11. Lower current feedback going to U11 can be achieved by using appropriate values for divider resistors R19 and R12.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments can be made, and other embodiments not specifically described herein will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A buck-boost converter circuit comprising:
an input configured to receive an input voltage;
an output configured to provide an output voltage;
a buck circuit having a first power switch and a first power diode coupled between the input and a ground reference;
a boost circuit having a second power switch and a second power diode coupled between the output and the ground reference;
a first feedback control circuit coupled between the output and the buck circuit, the first feedback control circuit configured to switch the buck circuit on and off based on a first reference voltage;
a second feedback control circuit coupled between the output and the boost circuit, the second feedback control circuit configured to switch the boost circuit on and off based on a second reference voltage; and
the first feedback control circuit and the second feedback control circuit are configured to avoid overlap operation of both the buck circuit and the boost circuit during a transition from a buck mode to a boost mode and vice versa;
wherein the first feedback control circuit comprises:
a first summation circuit configured to produce a first summation output that is a sum of a first peak current and a buck slope compensation value;
a first comparator configured to receive the first reference voltage and a feedback voltage based on the output voltage as inputs to the first comparator;
a second comparator configured to receive an output of the first comparator and the first summation output as inputs to the second comparator to generate a duty cycle at the output of the second comparator;
the second feedback control circuit including:
a second summation circuit configured to produce a second summation output that is a sum of a second peak current and a boost slope compensation value;
a third comparator configured to receive the second reference voltage and the feedback voltage based on the output voltage as inputs to the third comparator; and
a fourth comparator configured to receive an output of the third comparator and the second summation output as inputs to the second comparator to generate a duty cycle at the output of the second comparator.

2. A buck-boost converter circuit comprising:
an input configured to receive an input voltage;
an output configured to provide an output voltage;
a buck circuit having a first power switch and a first power diode coupled between the input and a ground reference;
a boost circuit having a second power switch and a second power diode coupled between the output and the ground reference;
a first feedback control circuit coupled between the output and the buck circuit, the first feedback control circuit configured to switch the buck circuit on and off based on a first reference voltage, the first feedback control circuit including:

a first comparator configured to receive the first reference voltage and a feedback voltage based on the output voltage as inputs to the first comparator; and
a second comparator configured to receive an output of the first comparator and an average current of the output voltage as inputs to the second comparator;
a third comparator configured to receive an output of the second comparator and a sawtooth signal as inputs to the second comparator to generate a duty cycle for the first power switch;
a second feedback control circuit coupled between the output and the boost circuit, the second feedback control circuit configured to switch the boost circuit on and off based on a second reference voltage, the second feedback control circuit including:
a fourth comparator configured to receive the second reference voltage and the feedback voltage based on the output voltage as inputs to the fourth comparator;
a fifth comparator configured to receive an output of the fourth comparator and the average current of the output voltage as inputs to the fifth comparator; and
a sixth comparator configured to receive an output of the fifth comparator and a sawtooth signal as inputs to the sixth comparator to generate a duty cycle for the second power switch;
wherein the first feedback control circuit and the second feedback control circuit are configured to avoid overlap operation of both the buck circuit and the boost circuit during a transition from a buck mode to a boost mode and vice versa.

3. A buck-boost converter circuit comprising:
an input configured to receive an input voltage;
an output configured to provide an output voltage;
a buck circuit having a first power switch and a first power diode coupled between the input and a ground reference;
a boost circuit having a second power switch and a second power diode coupled between the output and the ground reference;
a first feedback control circuit coupled between the output and the buck circuit, the first feedback control circuit configured to switch the buck circuit on and off based on a first feedback voltage and a first reference voltage, the first feedback control circuit including:
a first comparator configured to receive the first feedback voltage and the first reference voltage as inputs to the first comparator;
a second comparator configured to receive an output of the first comparator and a sawtooth signal as inputs to the second comparator to generate a duty cycle signal at the output of the second comparator for the first power switch; and
a first transistor configured to provide the output of the first comparator to either the second comparator or to ground;
a second feedback control circuit coupled between the output and the boost circuit, the second feedback control circuit configured to switch the boost circuit on and off based on a second feedback voltage and the first reference voltage, the second feedback control circuit including:
a third comparator configured to receive the second feedback voltage and the first reference voltage as inputs to the third comparator; and
a fourth comparator configured to receive an output of the third comparator and a sawtooth signal as inputs to the fourth comparator to generate a duty cycle signal at the output of the second comparator for the second power switch; and a second transistor configured to provide the output of the third comparator to either the fourth comparator or to ground;

wherein the first feedback control circuit and the second feedback control circuit are configured to avoid overlap operation of both the buck circuit and the boost circuit during a transition from a buck mode to a boost mode and vice versa.

* * * * *